G. M. FIERO.
STEERING MECHANISM FOR AUTOMOBILE LAMPS.
APPLICATION FILED AUG. 9, 1916.
1,226,492.
Patented May 15, 1917.
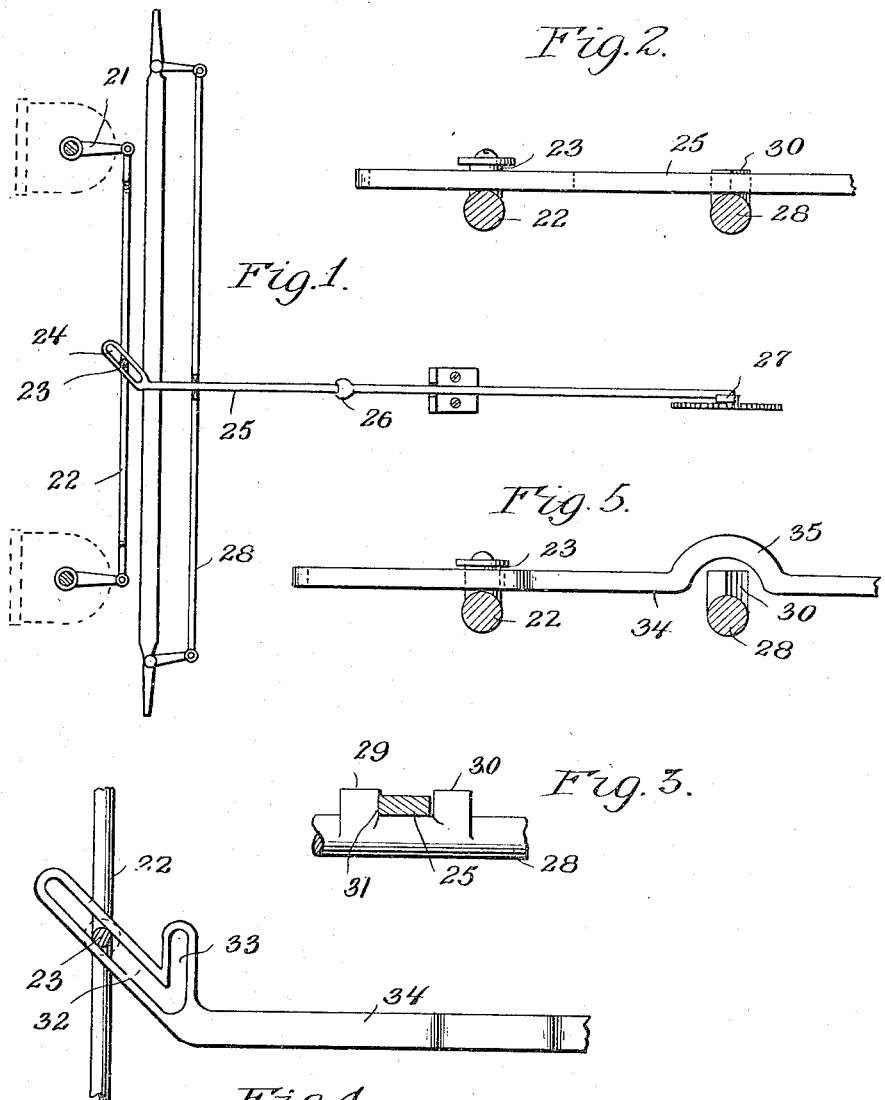

UNITED STATES PATENT OFFICE.

GEORGE M. FIERO, OF PITTSBURGH, PENNSYLVANIA.

STEERING MECHANISM FOR AUTOMOBILE-LAMPS.

1,226,492. Specification of Letters Patent. Patented May 15, 1917.

Application filed August 9, 1916. Serial No. 113,965.

*To all whom it may concern:*

Be it known that I, GEORGE M. FIERO, a citizen of the United States, residing at Pittsburgh, in the county of Allegheny and State of Pennsylvania, have invented new and useful Improvements in Steering Mechanism for Automobile-Lamps, of which the following is a specification.

This invention relates to control mechanism for pivoted lamps well known upon automobiles and has for its primary object to construct mechanism that the lamp may be turned about its pivot automatically.

An object of the invention is to accomplish the foregoing result with the minimum number of parts and the minimum amount of friction.

Another object of the invention is to accomplish the turning of the lamp automatically, the parts of which being so arranged as to be manually rendered inactive.

Besides the above my invention is distinguished in the novel manner of forming a connection between the steering rod of an automobile and the link that connects the lamps together.

A very important feature of my invention is the manner of constructing the control rod so that the automatic parts may be thrown out of operation upon the control rod moving a predetermined distance.

With these and other objects in view the invention will be better understood from the following detail description taken in connection with the accompanying drawing:

Figure 1 is a plan view of the invention.

Fig. 2 is a detail side elevation of a portion of the invention.

Fig. 3 is a cross sectional view of the rod.

Fig. 4 is a top plan view of a modified form of the invention.

Fig. 5 is a side elevation thereof.

In the drawing I have shown mechanism by means of which the lamps may be manually turned about their pivots by a person in the automobile or automatically moved by the steering mechanism of the automobile. Each lamp carries an arm 21 which are pivotally connected together by a link 22. This link 22 at any point in its length is formed with a laterally extending pin 23 slidably mounted in a slot 24 formed at one end of a two part rod 25. The parts of the rod have a ball and socket connection 26 with each other so that one of the parts may swing independently of the other. The slot 24 is arranged at an angle to the sliding movement of the link 22 so that when the lever 27 of the ratchet device is moving in either direction the inclined surfaces of the slot will engage the pin and give rectilinear movement to the link.

To accomplish the foregoing action automatically, the steering rod 28 of the steering mechanism has attached thereto or integral therewith V-shaped projections 29 and 30, the sharpened edge 31 of which engage that part of rod in which the slot 24 is formed.

From this arrangement it will be seen that upon movement of the steering rod 28 one part of the rod 25 will be swung laterally for giving movement to the lamps. I have found out from practice that the life of an apparatus of this character is very much shortened due to the wear and for this purpose I have illustrated in Figs. 4 and 5 means whereby the automatic operation of the mechanism is prevented during the day time use of the machine. To accomplish this the slot 32 carried by the rod 34 has a lateral extension 33 and the rod 34 is formed with an arch portion 35 adapted to come in alinement with the projections 29 and 30 when the rod is moved a predetermined distance.

The extension 33 is so arranged that it will be brought in alinement with the pin 23 when the arch portion 35 is in alinement with the projections so that the head lights will be free to assume their proper position.

From the foregoing description taken in connection with the accompanying drawings it should be apparent that I provide a mechanism which is admirably adapted for the purpose for which it is intended that the mechanism is simple, durable, and efficient of construction and may be manufactured and sold at a comparatively low cost.

What I claim is:—

1. In combination, a pair of head lamps, an arm connected to each lamp, a link connecting the arms together and a two part rod having a ball and socket connection with each other and one of the parts of said rod having a pin and slot connection with said link.

2. In combination, a pair of head lamps, an arm connected to each lamp, a link connecting the arms together and a two part rod having a ball and socket connection with each other and one of the parts of said rod having a pin and slot connection with said link, and automatic means associated with the steering mechanism of an automobile for moving the slotted part laterally.

3. In combination with the head lamps and steering rod of an automobile, an arm connected to each lamp, a link connecting the arms together, a control rod consisting of a main part and an auxiliary part having a ball and socket connection with each other said auxiliary part having a pin and slot connection with said link and means associated with said steering rod for swinging said auxiliary part.

4. In combination with the head lamps and steering rod of an automobile, an arm connected to each lamp, a link connecting the arms together, a control rod consisting of a main part and an auxiliary part having a ball and socket connection with each other, said auxiliary part having a pin and slot connection with said link and means associated with said steering rod for swinging said auxiliary part, said slot being arranged at an angle to the movement of said link.

5. In combination with the head lamps and steering rod of an automobile, and an arm secured to each lamp, a link connecting the arms together, a pin projecting laterally from said link, a control rod having a slot engaging said pin, said slot always assuming an angular relation to the movements of said link and means for giving reciprocatory movement to said rod and a connection between said control rod and said steering rod.

6. In combination with the head lamps and steering rod of an automobile, a pivotal connection including a link between said lamps spaced projections mounted upon said steering rod and a two part control rod one part of which being arranged between said projections and having a pin and slot connection with said link.

7. In combination with the head lamps and steering rod of an automobile, a pivotal connection including a link between said lamps, spaced projections mounted upon said steering rod and a two part control rod one part of which being arranged between said projections and having a pin and slot connection with said link, said slotted part of said rod being formed with an arch portion adapted to be moved in alinement with said projections.

8. In combination with the head lamps and steering rod of an automobile, a pivotal connection including a link between said lamp, spaced projections mounted upon said steering rod and a two part control rod one part of which being arranged between said projections and having a pin and slot connection with said link, said slotted part of said rod being formed with an arch portion adapted to be moved in alinement with said projections, said slot being so constructed so as to allow movement of the pin when said arch portion is arranged in alinement with said projections.

In testimony whereof I affix my signature.

GEORGE M. FIERO.

Copies of this patent may be obtained for five cents each, by addressing the "Commissioner of Patents, Washington, D. C."